United States Patent Office 3,537,932
Patented Nov. 3, 1970

1

2

3,537,932

PROCESS FOR ADHERING RUBBER LAYER TO POLYESTER TEXTILE ARTICLE

Hans Schrode, Wuppertal-Elberfeld, Germany, assignor to Vereinigte Glanzstoff-Fabriken AG, Wuppertal-Elberfeld, Germany No Drawing. Filed May 25, 1964, Ser. No. 370,120
Claims priority, application Germany, May 30, 1963, V 24,117
Int. Cl. B32b *7/10, 27/08*
U.S. Cl. 156—310 4 Claims

ABSTRACT OF THE DISCLOSURE

Process for adhering a rubber layer to a fibrous polyester article by prefinishing the polyester, e.g. polyethylene terephthalate, with a thin flexible coating of synthetic resin such as an epoxy resin, applying an anhydrous phenol and an anhydrous aldehyde to at least one of the surfaces to be joined, and vulcanizing the polyester article to the rubber layer through application of heat to form a phenolaldehyde resin joining the two surfaces. This method can be used, for example, in the production of automobile tires where the polyester serves as the tire cord.

This invention is concerned with a process for adhering a rubber layer in the form of a sheet, tube or the like to a fibrous polyester textile material, and more particularly, this invention relates to a process for improving the rubber-adhesion of such polyester textile materials in the manufacture of such articles as tires, conveyor belts, V-belts, hoses, coated fabrics and the like.

In manufacturing various articles consisting of rubber with a reinforcing textile inlay, it is important to obtain a secure adhesion of the textile material to the rubber, particularly if the reinforced article is subjected to severe strain or recurring stresses as in the case of automobile tires and similar articles. Poor adhesion between the rubber and textile inlay will cause the article to rupture and rapidly leads to a complete destruction of the reinforced article. Rubber articles have been reinforced by many different textile materials in the form of fibers, filaments, yarns, threads, cords, fabrics and webs, and it is quite common to employ fibrous textile materials composed of rayon or nylon, a good adhesion to rubber being achieved in such cases by means of a known single-stage, aqueous impregnating process followed by drying and/or curing. It is for this reason that rayon and polyamides such as nylon have been used extensively for the reinforcement of rubber articles.

By comparison, it is very difficult to achieve a good adhesion of fibrous polyester textile materials to rubber, and the usual methods employed with rayon and polyamide fibers does not provide a satisfactory adhesion. For most commercial applications, it is necessary to have a high adhesive strength of at least about 12 kg. between the rubber layer and the fibrous textile article as measured with a 2 cm. wide test strip. Such results are seldom achieved with polyester fibers, or else the methods employed for improving the rubber-adhesion of the polyester fiber have other disadvantages which make them commercially impractical.

In order to improve the rubber-adhesion of the polyester textile article, one single-stage process is known in which the textile article such as a tire cord or belt fabric is treated with a benzene solution of rubber containing an isocyanate. One disadvantage of this process is the low stability of the impregnation, the rubber solution rapidly losing its effectiveness under the influence of normal humidity in the atmosphere. Furthermore, the isocyanate tends to react with the rubber during storage, thereby substantially increasing the viscosity of the solution and making it quite difficult to handle and apply to the textile article. Another troublesome feature of this known process is the severe fouling of necessary apparatus by the isocyanate-containing rubber solution.

Two-stage treatment processes have been proposed for improving the rubber-adhesion of polyester textile articles, including a first stage in which the textile article is immersed in an aqueous dispersion of resin-forming components and is then dried and heated to form a synthetic resin coating on the fibers. In the second stage of the process, the resin-coated polyester textile article is impregnated with an aqueous mixture of vinyl pyridine latex, i.e. a copolymer of butadiene/styrene and vinyl pyridine, in combination with a partly condensed resorcinol-formaldehyde resin. Such processes, which require a first-stage treatment with blocked isocyanates, for example, are not particularly desirable from a technological viewpoint because of the need for relatively complex apparatus and high temperatures. Thus, it is usually necessary to vulcanize the rubber to the fabric while the article is maintained under heat-shrinkage tension. Moreover, the cord or fabric becomes relatively stiff when penetrated by the various aqueous mixtures, and where there has been an impregnation with a high dosage or high load rate of the resins and binding agents, the resulting article will have a poor fatigue resistance.

Another proposal for improving the rubber-adhesion of textile materials involves the introduction of resorcinol and formaldehyde as dry components, for example in the form of a powder, between the textile article and the rubber. The dry components are then heat-cured in situ as a binding agent at the interface or juncture between the textile and rubber surfaces. However, a satisfactory adhesion has only been obtained with this technique in the use of rayon or nylon textiles, and the adhesion with polyester textiles is very weak and unsatisfactory.

One object of the present invention is to provide an improved method for adhering a rubber layer to a polyester textile article so as to achieve a very high adhesive strength between the adjoining surfaces.

Another object of the invention is to provide a method of improving the rubber adhesion of a polyester textile material by using materials which are easy to handle and can be processed on conventional textile apparatus. Still another object of the invention is to provide a process for adhering a rubber layer to a polyester textile article whereby the textile fibers retain their flexibility and are better able to withstand fatigue.

Yet another object of the invention is to provide a process for vulcanizing and adhering rubber to polyester fibers wherein the components of the heat-curable binding agent can be applied and vulcanized in the absence of any substantial amount of water.

The following detailed description of the invention is necessarily limited to the most important and preferred features of the new process in achieving the foregoing objects and advantages. One particularly advantageous embodiment of the invention resides in the treatment described hereinafter of a polyester textile article in which the fibers are coated with an epoxy resin.

In accordance with the invention, it has now been found that the rubber-adhesion of a polyester textile article can be substantially improved in an advantageous manner by applying an anhydrous phenol and an anhydrous aldehyde to at least one of the surfaces of the rubber layer and the textile article to be joined, the polyester fibers of the textile article having been prefinished with a thin, flexible coating of a synthetic resin, and then vulcanizing the rubber layer to the textile article by heating to form a phenol-aldehyde resin joining the two surfaces. The phenol and aldehyde components as heat-curable binding composition can be applied to either or both of the juncture surfaces, i.e. either to the surface of the textile article and/or to the surface of the rubber layer, in the dry or anhydrous state by dusting or doctor knife finishing the anhydrous components onto the surface structure. The "dry" components can then be heat-cured to form an interlayer of a phenol-aldehyde resin which creates a strongly adherent vulcanized bond between the rubber and the polyester fibers. This vulcanization or bonding step is preferably carried out at a temperature of about 135 to 170° C.

The polyester fibers employed in making the textile reinforcing article for the purposes of this invention, for example in the form of yarns, cords, fabrics or webs, are preferably such well-known polyesters as polyethylene terephthalate and poly-1,4-dimethylolcyclohexane terephthalate. Other fiber-forming polyesters are also known in the art as are generally obtained by the polycondensation of a glycol with an aromatic dicarboxylic acid. Mixtures of glycols and acids can also be used in order to provide mixed polyesters, particularly where it is desirable to substantially increase the tensile strength or other desirable properties of the extruded and stretch-oriented filaments. The process of the present invention is generally applicable to this class of fiber-forming polyesters, since this class of fibers has poor rubber adhesion properties by comparison with cellulosic or polyamide fibers such as rayon or nylon.

In prefinishing the polyester textile fibers, a synthetic resin should be employed which does not substantially increase the stiffness of the fibers and should be applied in relatively small amounts so as to provide a thin, flexible coating on the surface of the fiber or the textile article. A wide variety of synthetic resins have been found suitable in combination with the dry phenol-aldehyde bonding agent for the purpose of increasing the rubber-adhesion properties of the polyester as compared to the use of the bonding agent alone. However, the improvement in adhesive strength of the bonding agent is particularly advantageous when the polyester fibers have been prefinished with an epoxy resin. The epoxy resin is obtained by reacting a polyglycidyl ether in the presence of an amine curing agent at elevated temperatures, preferably in situ on the fibers. It is especially advantageous to employ water-soluble components in forming the epoxy resin since these components may then be applied to the fibers from an aqueous solution, and this application can take place during the original spinning of the polyester filaments, i.e. immediately after they have been extruded and stretched for fiber orientation. On the other hand, the application of the epoxy resin can also be carried out during subsequent filament processing or after the filaments have been woven or otherwise formed into the textile article which is to be adhered to the rubber layer. A satisfactory flexible coating on the polyester fibers is most easily obtained by using water-soluble polyglycidyl ethers of polyhydroxylated saturated aliphatic hydrocarbons of from 2 to about 10 carbon atoms, preferably the diglycidyl ether of lower alkanediols or the triglycidyl ether of lower alkanetriols. The following compounds are illustrative: ethyleneglycol-diglycidic ether, 1,2-propanedioldiglycidic ether, 1,3 - propanediol-diglycidic ether, 1,3 - butanediol-diglycidic ether, 1,4-butanediol-diglycidic ether, 2,3-butnaediol-diglycidic ether and the glycidyl ethers of hexanetriol and sorbitol which contain two or three glycidic groups per molecule, e.g. the triglycidyl ether of hexanetriol.

The amine curing agent employed in forming the epoxy resin is preferably a lower molecular weight aliphatic or heterocyclic amine which consists solely of carbon, hydrogen and nitrogen atoms, the nitrogen atoms being attached to a hydrocarbon structure of from 1 to 10 carbon atoms, preferably about 2 to 6 carbon atoms. Especially advantageous amines are hexamethylene diamine, di-isopropylamine, guanidine, piperazine, 2,5-dimethylpiperazine, pyridine and piperidine. Alkylated derivatives of these compounds are likewise useful, such as N-lower alkyl-guanidines and dicyandiamide, as well as various polyalkylene polyamines, imines and polyimines disclosed in such standard references as "Epoxy Resins," by Skeist, (Chapt. 3), Reinhold Publishing Corp., New York (1964). With these amines, it is generally useful to cure the epoxy resin on the polyester fibers at a temperature of about 160°–245° C.

A large number of resins are being investigated for use within the scope of the present invention, and the following resins have been found useful in precoating the polyester fibers: acrylic polymers and copolymers, polyethylenimine, polyvinylchloride, isocyanate resins, and low molecular weight linear polyamides. Such resins can be used in combination with each other, but preferably in combination with the more advantageous epoxy resins. Wherever possible, the synthetic resin should be chosen such that it can be applied to the polyester fibers from an aqueous solution and then, if necessary, further cured or hardened on the fiber itself. Thus, the preferred acrylic resins are those obtained from water-soluble polymers of acrylamide or methacrylamide, and polyethyleneimine can also be applied in its lower molecular weight water-soluble form. These resin-forming components should be relatively resistant to cross-linking reactions during any treatment of the fiber or filaments prior to the vulcanization step of the present invention. Most importantly, it is desirable to employ synthetic resins which do not substantially decrease the desirable flexibility of the polyester fibers, and the amount of resin applied to the fibers should normally be maintained wihtin limits of about 0.1 to 1% by weight with reference to the dry weight of the fibers.

The actual bonding of the polyester textile article to the rubber layer in accordance with the invention is especially advantageous in that it can be accomplished with the exclusion of water, i.e. by using anhydrous or dry phenol and aldehyde components. For example, in a preferred embodiment of the invention, the polyester textile article in which the filaments are preferably precoated with an epoxy resin, is coated or dusted with dry resorcinol and dry paraformaldehyde and then brought together with the rubber layer, or else the dry resorcinol and the dry paraformaldehyde are applied to the rubber layer and the polyester textile material joined therewith. It is also possible to apply one component, e.g. the resorcinol, to the surface of the rubber layer while applying the other component, paraformaldehyde, to the opposing surface of the textile layer and then join the two surfaces for vulcanization. In most cases, it is expedient to apply the dry components of the phenol-aldehyde bonding mixture to the material which forms the bottom layer in the processing equipment. If a thick coating is desired, the components may be applied individually to both of the opposing surfaces of the rubber and the polyester textile article. The manner in which these phenol and aldehyde components are applied in any particular case, for example by dusting a powder or by doctor knife finishing, depends upon the consistency of the components, i.e. whether they are present in the form of a powder or in a paste. It is generally sufficient to simply use the components in powder form, but it is also feasible to apply a component such as resorcinol as a paste formed by admixture with a solution of rubber in an organic solvent such as benzene.

Paraformaldehyde is especially preferred as the aldehyde component of the bonding agent, since it is readily available and can be easily applied in its dry or anhydrous state. However, it is also feasible to employ other formaldehyde-generating compounds such as hexamethylenetetramine, sodium formaldehyde bisulfite, hexamethoxymethyl melamine, lauryloxymethyl pyridinium chloride and its cetyl and ethyl homologs. In general, the molar ratio of formaldehyde:phenol should be approximately 2:1 to 3:1.

The phenol component of the bonding agent is preferably resorcinol, but it is also possible to use other di- and tri-hydroxy benzene compounds or mixtures of such phenolic compounds with the aldehyde. In particular, the following phenols are useful: resorcinol; hydroquinol; pyrocatechol; pyrogallol; phloroglucinol; and 1,2,4-trihydroxy-benzene. By using two or more of these phenols in a mixture, especially with resorcinol, it is possible to achieve some advantages in terms of process technology and a further improvement in rubber-adhesion.

After the dry components of the bonding agent have been applied to one or both of the surfaces to be joined as between the polyester textile article and the rubber layer, the two surfaces are placed in contact with each other and heated and vulcanized with or without application of pressure. The amount of bonding agent employed can be varied within wide limits while maintaining a uniform application with complete coverage of the surfaces to be joined. The vulcanization should be carried out at a temperature of about 135–170° C.

The process of the invention is especially useful in manufacturing rubber articles having a tightly woven reinforcing inlay of a polyester cord or web, for example in producing fire hoses of high quality and durability. It has been particularly difficult to obtain good rubber-adhesion with fire hoses in which an outer tubular woven fabric of polyester fibers is applied to an inert Manchon rubber, i.e. an extruded tube of rubber. In this particular application of the invention, a mixture of anhydrous resorcinol and paraformaldehyde, for example, is dusted as a fine powder onto the rubber tube which is then drawn into the tubular woven fabric and vulcanized in place.

The present invention provides an improved rubber-adhesion with polyester textile materials not only when using natural rubber but also when using various synthetic rubber such as styrene/butadiene-rubber, polychlorobutadiene-rubber and nitrile-rubber. The rubber may contain various additives such as anti-oxidants, pigments, or the like, and the polyester fibers may be dyed or pigmented in any desired manner.

The invention is further illustrated but not limited by the following examples.

EXAMPLE 1

A polyethylene terephthalate conveyor band fabric having a weight of 360 g./m.$^2$ was vulcanized at 140° C. under a pressure of 10 kg./cm.$^2$ with a natural rubber sheet which had been dusted with about 0.8 g./100 cm.$^2$ of a mixture of anhydrous resorcinol and paraformaldehyde (weight ratio=2:1) as a powdery bonding agent. Prior to manufacture of the conveyor band fabric, the polyester filaments were provided with a thin flexible coating of an epoxy resin by applying to the filaments an aqueous solution of 1,4-butanediol-diglycidic ether and piperazine (weight ratio=70:7). After applying this aqueous solution, the filaments were dried and cured at a temperature of about 270° C. The resulting epoxy resin coating amounted to 0.2% by weight, with reference to the dry weight of the filaments. For purposes of comparison, a normal conveyor band fabric of untreated polyethylene terephthalate filaments was vulcanized to an untreated natural rubber and to a natural rubber treated with a resorcinol-paraformaldehyde coating in exactly the same manner as set forth above. The adhesive strength was determined in each case by using sample strips having a width of 4 cm. and by pulling the fabric off from the rubber. The results of the comparison are shown in the following table.

TABLE I

| | |
|---|---|
| Normal fabric without synthetic resin coating: | |
| Untreated rubber, adhesive strength, kg. | 1.6 |
| Rubber with resorcinol paraformaldehyde coating, adhesive strength, kg. | 6.0 |
| Fabric with epoxy resin coating; and rubber with resorcinol paraformaldehyde coating, adhesive strength, kg. | 28 |

When using the fabric without an epoxy resin coating, there was only a slight, inadequate improvement in rubber-adhesion even when applying a resorcinol-paraformaldehyde bonding agent to the rubber. On the other hand, when using a polyester fabric in which the filaments were precoated with an epoxy resin coating, the application of the resorcinol/paraformaldehyde bonding agent to the juncture surfaces provided a very high adhesive strength in excess of the desired minimum adhesion of 12 kg./2 cm.

A similar improvement in rubber-adhesion is possible when using a woven polyester fabric composed of poly-1,4-dimethylolcyclohexane terephthalate in place of polyethylene terephthalate.

EXAMPLE 2

A polyethylene terephthalate fire hose tubular fabric in which the filaments were precoated with an epoxy resin film in the same manner as Example 1, was inserted over a conventionally extruded rubber tube dusted with about 0.4 g./100 cm.$^2$ of the resorcinol/paraformaldehyde mixture described in Example 1. The inner surface of the fabric was vulcanized to the outer coated surface of the tube at a temperature of 140° C. for 30 minutes at a pressure of 4 atmospheres. Various Manchon-rubber samples composed of usual rubber mixtures were tested after treatment in this manner and compared with control samples. The results, as shown in the following table, again showed a strong increase in adhesion with the samples treated according to the invention as compared to the normal fabric and the treatment with resorcinol/paraformaldehyde powder alone.

TABLE II

| | Adhesive strength in kg./2 cm. of of fire hose fabric vulcanized to Manchon rubber composed of— | | |
|---|---|---|---|
| | Nitrile rubber | Polychlorobutadiene rubber | Natural and butadiene-styrene rubber |
| (1) Normal fabric (untreated); Rubber tube (untreated) | 1.1 | 0.8 | 1.2 |
| (2) Normal fabric (untreated); Rubber tube powdered with resorcinol/paraformaldehyde | 2.8 | 2.0 | 3.5 |
| (3) Fabric having filaments pretreated with epoxy resin film; Rubber tube powdered with resorcinol/paraformaldehyde | 6.4 | 4.0 | 5.8 |

EXAMPLE 3

A polyethylene terephthalate conveyor belt fabric according to Example 1, was brushed to provide a precoated film thereon with an emulsified mixture of:

| | Parts by weight |
|---|---|
| Polyvinyl chloride emulsion | 40 |
| Water | 60 |
| Polyamide produced by condensation of linoleic acid and a lower aliphatic diamine, (e.g. Versamid 125) | 5 |
| Dioctylphthalate | 12 |
| Stearine amidopropyl-dimethyl-β-hydroxy-ethylammonium-dihydrogen phosphate (Catanac SP) | 4 |
| Ethoxylated octylphenol containing about 4–7 ethoxy groups and having a mol. weight of about 350 (Triton X 100) | 0.6 |
| Glacial acetic acid | 0.3 |
| Isopropyl alcohol | 2.5 |
| Oleic acid | 0.7 |
| Ammonia | 0.2 |

The precoated fabric was dried at 210° C. and then brought together with a natural rubber sheet which was coated with 0.08 g./100 cm.$^2$ powdery dry mixture of resorcinol and paraformaldehyde (weight ratio=2:1). The fabric and rubber sheet were then vulcanized at 140° C. for 30 minutes. The adhesive strength of a 4 cm. wide strip was 23 kg., which is four times as high as that obtained with an untreated polyester fabric vulcanized with rubber coated only with the resorcinol/paraformaldehyde mixture (Compare with Table I).

EXAMPLE 4

The same polyester conveyor belt fabric as in Examples 1 and 3 was precoated with an aqueous dispersion of a blocked isocyanate, the bis-phenol adduct of methylene-bis-(4-phenylene-isocyanate) having the formula

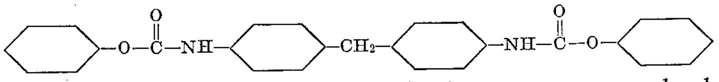

(Hylene MP, Trademark Du Pont)

and dried at 220° C. for 5 minutes to provide a thin resin film of about 0.5% by weight, with reference to the dry weight of the fabric. This fabric was vulcanized to a natural rubber sheet, which previously had been dusted with a mixture of 1.8 g./100 cm.$^2$ of dry resorcinol and paraformaldehyde (weight ratio 2:1), at 140° C. and a pressure of 10 kg./cm.$^2$ The adhesive strength of a 4 cm. wide strip amounted to 24 kg.

EXAMPLE 5

The same polyester conveyor belt fabric of Examples 1, 3 and 4 was coated with a 20% solution (solvent=7 parts methanol, 2 parts benzene, and 1 part water) of a low molecular weight polyamide, the polyamide being a condensation product of adipic acid and hexamethylene diamine with a polymerization degree of about 200. The fabric was then dried to provide a thin, flexible resin coating thereon. A sheet of natural rubber was dusted with 0.8 g./100 cm.$^2$ of a dry powdery mixture of 2 parts by weight resorcinol and 1 part by weight paraformaldehyde. The rubber sheet and conveyor belt fabric were again placed together with the intermediate resorcinol/paraformaldehyde at the adjoining surfaces vulcanized at 140° C. and a pressure of 10 kg./cm.$^2$ for 30 minutes. The adhesive strength of 4 cm. wide strips was 26 kg.

EXAMPLE 6

A polyethylene terephthalate fabric having a weight of 200 g./m.$^2$ was coated with a 1% aqueous solution of a partly condensed ethylenimine (molecular weight of about 3000) and dried at a temperature of 120° C. to provide a polyethylenimine resin film on the fabric. This precoated fabric was then brought into contact with the surface of a rubber sheet which had been dusted with 0.4 g./100 cm.$^2$ of a powdery paraformaldehyde/resorcinol mixture having a weight ratio of 1:2. The fabric was then vulcanized to the rubber at 140° C. for 30 minutes. The adhesive strength of a 2 cm. wide strip amounted to 8 to 10 kg. as compared to 3–4 kg. when using an untreated polyester fabric.

EXAMPLE 7

The polyester fabric of Example 6 was prefinished with an acrylic resin (Texapret a Trademark of Badische Anilin- und Soda-Fabriken) as a 3% aqueous solution, dried and vulcanized in the same manner as Example 6. The adhesive strength of a 2 cm. wide sample strip amounted to 8–11 kg. and was 2½ to 3 times greater than that of the non-finished fabric.

The acrylic resin used in this example was a copolymer consisting essentially of polyacrylic acid, having a K-value of 160 (as defined in the book K. H. Meyer: Natural and Synthetic High Polymers, New York, 1955, p. 36, 37).

The invention is hereby claimed as follows:

1. A process for adhering a rubber layer to a fibrous polyester textile article wherein the polyester is selected from the class consisting of polyethylene terephthalate and poly-1,4-dimethylolcyclohexane terephthalate, which process comprises: prefinishing the polyester fibers of said textile article with a thin, flexible coating of an epoxy resin by applying an aqueous solution of a water-soluble polyglycidyl ether of a polyhydroxylated saturated aliphatic hydrocarbon of from 2 to 10 carbon atoms and a water-soluble amine curing agent and heat-curing to form the epoxy resin on said fibers at a temperature of about 160°–245° C.; applying anhydrous resorcinol and anhydrous formaldehyde to at least one of the surfaces of said prefinished textile article and said rubber layer to be joined; and vulcanizing the textile article to the rubber layer by heating at a temperature of about 135° C. to 170° C. to form a resorcinol-formaldehyde resin joining the two surfaces.

2. A process as claimed in claim 1 wherein the epoxy resin is obtained by heat-curing a compound selected from the class consisting of the diglycidyl ether of lower alkanediols and the triglycidyl ether of lower alkanetriols in the presence of an amine curing agent selected from the class consisting of hexamethylene diamine, di-isopropylamine, guanidine, piperazine, 2,5-dimethylpiperazine, pyridine and piperidine.

3. A process as claimed in claim 1 wherein the epoxy resin is obtained by heat-curing the diglycidyl ether of a lower alkanediol in the presence of piperazine as the amine curing agent.

4. A process as claimed in claim 1 wherein the epoxy resin is obtained by heat-curing the diglycidyl ether of 1,4-butanediol in the presence of piperazine as the curing agent.

References Cited

UNITED STATES PATENTS 3,226,276 12/1965 Rye et al.

WILLIAM J. VAN BALEN, Primary Examiner

R. J. ROCHE, Assistant Examiner

U.S. Cl. X.R.

156—110, 330, 335; 161—184, 231

PO-1050
(5/69)

UNITED STATES PATENT OFFICE
CERTIFICATE OF CORRECTION

Patent No. 3,537,932 Dated November 3, 1970

Inventor(s) Hans Schrode

It is certified that error appears in the above-identified patent and that said Letters Patent are hereby corrected as shown below:

Column 4, line 2, "2,3-butnaedi-" should read -- 2,3-butanedi- --.

Column 5, line 51, "polychlo-" should read -- polychloro- --.

Column 6, line 10, "270°" should read -- 210° --.

SIGNED AND
SEALED
FEB 2 [illegible]

(SEAL)
Attest:

Edward [illegible], Jr.
Attesting Officer

WILLIAM E. SCHUYLER, JR.
Commissioner of Patents